3,236,878
UNSATURATED ESTERS
Kent C. Brannock, Kingsport, Tenn., assignor to Eastman Kodak Company, Rochester, N.Y., a corporation of New Jersey
No Drawing. Filed Oct. 9, 1962, Ser. No. 229,489
4 Claims. (Cl. 260—484)

This invention relates to new chemical compounds and more particularly to novel unsaturated esters and to a method of preparing such esters by the reaction of a ketene acetal with an acetylenic ester.

The invention is based on my discovery that when a ketene acetal of the type:

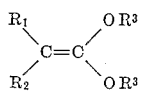

is caused to react with an acetylenic ester of the type, Z—C≡C—COOR⁴, a carbon skeletal rearrangement occurs, and a novel compound is formed having the structure,

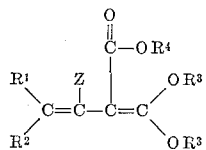

where $R^1$ and $R^2$ are hydrogen or alkyl groups or joined alkylene groups, which with the carbon atom to which they are attached, form an alicyclic ring; the substituents $R^3$ are alkyl groups or joined alkylene groups that form a cyclic acetal; $R^4$ is a monovalent organic radical free of functional substituents; and Z is hydrogen or a monovalent organic radical, preferably an alkyl, aryl, carbalkoxy or cyano group. These novel compounds are useful as chemical intermediates, for example, in the preparation of branched chain monoolefinic carboxylic acids.

Although I do not wish to be bound by theoretical explanations, a possible explanation of the process of the invention is that the reaction of the ketene acetal and the acetylenic ester proceeds through the formation of a cyclobutene intermediate, as shown in the following equation:

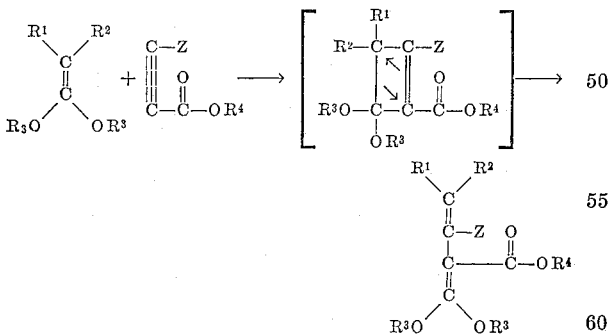

The invention is further illustrated by the following examples. The first example illustrates preparation of a novel compound of the invention by the reaction of an acetylenic ester of the type, Z—C≡C—COOR⁴, in which Z is a carbalkoxy radical.

Example 1

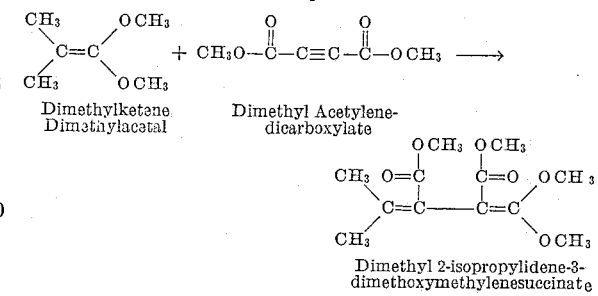

Dimethylketene     Dimethyl Acetylene-
Dimethylacetal       dicarboxylate

Dimethyl 2-isopropylidene-3-
dimethoxymethylenesuccinate

Dimethylketene dimethyl acetal (38.6 g., 0.33 mole) and dimethyl acetylenedicarboxylate (47.3 g., 0.33 mole) were combined and heated under reflux at 160–167° C. for two hours. Distillation of the reaction mixture gave, after removal of unreacted starting materials, 51 g. (60%) of dimethyl 2-isopropylidene-3-dimethoxymethylene succinate, B.P. 95–100° at about 0.5 mm., $n_D^{20}$ 1.4978.

The next example illustrates the use of the novel product of Example 1 in the preparation of teraconic acid.

Example 2

Treatment of dimethyl 2-isopropylidene-3-dimethoxymethylene succinate (25.8 g., 0.1 mole), as prepared in Example 1, with 25 ml. of water, 25 ml. of methanol and 0.1 ml. of concentrated hydrochloric acid for 30 minutes at reflux followed by distillation gave 21.5 g. (88%) of trimethyl 3-methyl-2-butene-1,1,2-tricarboxylate. Saponification of 20 g. of the latter with aqueous potassium hydroxide followed by acidification with hydrochloric acid led to the evolution of carbon dioxide and gave 9.1 g. (70%) of teraconic acid.

The next example describes the preparation of another novel compound of the invention, the preparation involving the reaction of an acetylenic ester of which the substituent Z is hydrogen.

Example 3

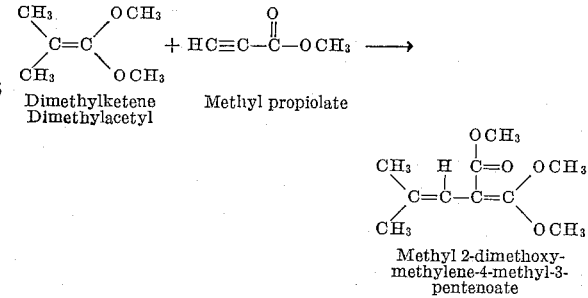

Dimethylketene     Methyl propiolate
Dimethylacetyl

Methyl 2-dimethoxy-
methylene-4-methyl-3-
pentenoate

A mixture of dimethylketene dimethyl acetal (28 g., 0.24 mole) and methyl propiolate (20 g., 0.24 mole) was heated under reflux for 20 hours while the temperature rose from 101° to 169° C. Distillation gave 23 g. (42%) of methyl 2-dimethoxymethylene-4-methyl-3-pentenoate, B.P. 72–75° C. at 1 mm., $n_D^{20}$ 1.4903. In a series of reactions similar to those described in Example 2, the latter compound was converted to 4-methyl-3-pentenoic acid in good yield.

The next example illustrates the use in the method of the invention of a keteneacetal in which the substituents $R^1$ and $R^2$ are hydrogen atoms.

Example 4

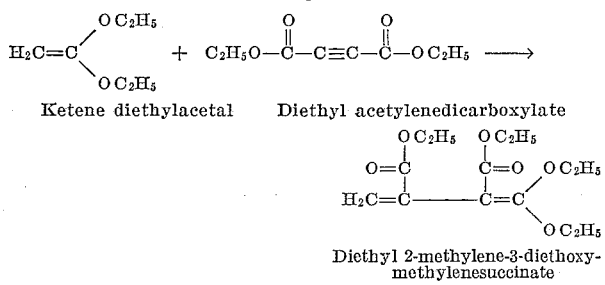

Ketene diethylacetal      Diethyl acetylenedicarboxylate

Diethyl 2-methylene-3-diethoxy-
methylenesuccinate

Ketene diethylacetal (20 g., 0.172 mole) was dissolved in 50 ml. of acetonitrile and diethyl acetylene dicarboxylate (29.2 g., 0.172 mole) was added. The temperature of the reaction mixture rose spontaneously to a maximum of 66° after 8 minutes and then began to drop. Distillation, after 1½ hours, gave, after removal of solvent and low-boilers, 26 g. (53%) of diethyl 2-methylene-3-diethoxymethylene succinate, B.P. 116–120° at 0.5 mm., $n_D^{20}$ 1.4741. In a series of transformations such as described in Example 2 the latter compound was converted to itaconic acid in 53% yield.

In the ketene acetals of the type, $R^1R^2C:C(OR^3)_2$, as used in my process, $R^1$ and $R^2$ can be the same or different substituents and can be (a) hydrogen; (b) a straight or branched chain alkyl radical, preferably a lower alkyl radical having, for example, 1 to about 4 carbon atoms, e.g., methyl, ethyl, propyl, isopropyl, n-butyl, isobutyl, etc.; or (c) alkylene radicals which, with the carbon atom to which they are attached, form a carbocyclic ring, e.g., a 5 or 6 membered, saturated, alicyclic ring. The substituents $R^3$ can be the same or different straight or branched chain alkyl radicals, preferably, they are lower alkyl radicals of the types above indicated. They can also be lower alkylene radicals joined in a saturated ring, e.g., of 5 to 6 members, with the oxygen and carbon atoms to which they are attached. Examples of suitable ketene acetals include: dimethylketene dimethylacetal, ethylmethylketene dimethylacetal, dibutylketene diethylacetal, tetramethyleneketene dipropylacetal, pentamethyleneketene ethylbutylacetal, and the like.

I have illustrated my process with acetylenic esters, $Z.C:C.COOR^4$, in which the ester radical, $-COOR^4$, is a carbalkoxy radical derived from a lower alkanol, specifically, methanol or ethanol. However, and although I do not wish to be bound by theoretical explanations of the mechanism of the reaction, it appears that the carbon skeletal rearrangement occurring in the reaction depends upon the ester radical being an electron-withdrawing group in a conjugated position with respect to the acetylenic triple bond. Therefore, the process is broadly applicable to a wide range of monovalent radicals as $R^4$, such radicals being free of functional substituents that would adversely affect the desired reaction. Preferably, $R^4$ is a residue of a straight or branched chain lower alkanol such as methanol, ethanol, 1-propanol, 2-propanol, 1-butanol, 2-methyl-1-propanol, 2-butanol, 2-methylpropanol or the like, but can be various other aliphatic or aromatic alcohol residues which would not adversely affect the reaction.

The substituent Z of the acetylenic ester can be any monovalent organic radical that does not adversely affect the reaction and can include hydrogen and such radicals as alkyl, aryl, cyano and ester radicals, the preferred radicals of such types being the lower alkyl, monocyclic aryl with or without lower alkyl side chains, cyano, and carbalkoxy radicals. Most suitable, Z is hydrogen or a carbalkoxy radical derived from a lower alkanol. Examples of suitable acetylenic esters having substituents Z and $R^4$ of the above types include methyl propiolate, ethyl propiolate, n-propyl phenylpropiolate, i-butyl propiolate, methyl cyclohexylpropiolate, diethyl acetylenedicarboxylate, ethyl cyanopropiolate, cyanoacetylene, dimethyl acetylenedicarboxylate, ethyl tetrolate, etc.

As shown in the examples, the reaction of the ketene acetal and the acetylenic ester can be accomplished by mixing the reactants in substantially equimolar proportions and heating under reflux for a length of time that can range from a few minutes to several hours, depending on the reactivity and stability of the particular reactants and products and the degree of completion of the reaction desired. With most ketene acetals and acetylenic esters of the types indicated, an excess of either reactant can be used and more severe reaction conditions can be used than those of the working examples, although equimolar ratios and temperatures no higher than about 175° C. are preferred. I have found that when employing an acetal of simple ketene, i.e., $R^1$ and $R^2$ being hydrogen, it is important to use mild conditions and to avoid the use of excess ketene acetal. With this type of acetal, as illustrated in Example 4, best results are obtained with a 1:1 mole ratio of ketene acetal to acetylenic ester and a temperature not exceeding about 130° C.

As demonstrated in Example 2, the novel compounds of the invention can be converted to branched chain olefinic carboxylic acids. This is accomplished by converting the unsaturated acetal (I) of the type,

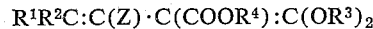

to an ester (II) of the type,

by hydrolysis. Any procedure for hydrolysis of acetals can be used. The preferred procedure comprises mixing the acetal (I) with at least an equimolar amount of water containing a catalytic amount of an inorganic acid or organic acid. The hydrolysis proceeds at room temperature but can be performed at higher or lower temperatures, e.g., 0° C. to reflux temperature.

Conversion of the ester (II) to a branched chain monoolefinic aliphatic acid is accomplished by treatment with aqueous alkali which leads to saponification giving a substituted malonic acid which loses carbon dioxide to give the acid $R^1R^2C:C(Z)CH_2-COOH$. This can be done by mixing ester (II) at room temperature with at least an equimolar amount of an aqueous solution of a base such as sodium hydroxide, potassium hydroxide, barium hydroxide or the like. Higher or lower temperatures can be used.

The invention has been described in considerable detail with particular reference to certain preferred embodiments thereof, but it will be understood that variations and modifications can be effected within the spirit and scope of the invention as described hereinabove, and as defined in the appended claims.

I claim:
1. A compound of the formula

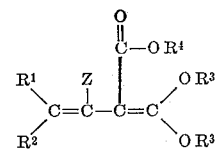

where $R^1$ and $R^2$ are selected from the group consisting of hydrogen, lower alkyl radicals and joined lower alkylene radicals; the substituents $R^3$ are selected from the group consisting of lower alkyl radicals and joined lower alkylene radicals, $R^4$ is a lower alkyl radical and Z is selected from the group consisting of hydrogen, lower alkyl radicals, monocyclic aryl radicals, carbalkoxy radicals derived from lower alkanols, and the cyano radical.

2. A compound of the formula
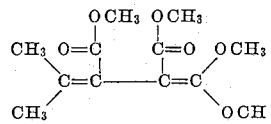
3. A compound of the formula
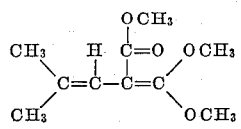
4. A compound of the formula
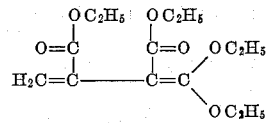
References Cited by the Examiner
UNITED STATES PATENTS
3,030,359  4/1962  Arens _____ 260—484 X
LORRAINE A. WEINBERGER, *Primary Examiner.*
LEON ZITVER, *Examiner.*